United States Patent [19]
Hayashigawa

[11] Patent Number: 5,865,624
[45] Date of Patent: Feb. 2, 1999

[54] REACTIVE RIDE SIMULATOR APPARATUS AND METHOD

[76] Inventor: Larry Hayashigawa, 7235 La Cumbre Dr., Orange, Calif. 92669

[21] Appl. No.: 555,525

[22] Filed: Nov. 9, 1995

[51] Int. Cl.⁶ .............................. G09B 9/04; G09B 19/16
[52] U.S. Cl. .................. 434/66; 434/29; 434/62; 434/69; 434/71; 434/307 R; 364/578; 463/36; 463/6; 472/60; 701/2
[58] Field of Search ................................. 434/29, 30, 45, 434/60–61, 71, 307 R, 308, 365; 463/6, 35–40; 348/39, 114–118; 472/60, 136; 364/423.099, 424.33, 578; 244/3.14, 190; 701/1, 2, 48, 49, 67

[56] References Cited

U.S. PATENT DOCUMENTS

| | | | |
|---|---|---|---|
| 3,564,134 | 2/1971 | Rue ............................................. | 348/39 |
| 4,223,343 | 9/1980 | Belmares-Sarabia et al. . | |
| 4,283,766 | 8/1981 | Snyder et al. . | |
| 4,340,972 | 7/1982 | Heist ..................................... | 434/433 X |
| 4,361,202 | 11/1982 | Minovitch . | |
| 4,752,065 | 6/1988 | Trumbull et al. .......................... | 472/60 |
| 4,771,344 | 9/1988 | Fallacaro et al. . | |
| 4,807,202 | 2/1989 | Cherri et al. ........................... | 434/44 X |
| 4,817,948 | 4/1989 | Simonelli ................................ | 434/63 X |
| 4,855,822 | 8/1989 | Narendra et al. ........................ | 348/114 |
| 4,976,438 | 12/1990 | Tashiro et al. .............................. | 463/34 |
| 5,015,189 | 5/1991 | Wenzinger, Jr. ............................ | 434/63 |
| 5,023,725 | 6/1991 | McCutchen . | |
| 5,130,794 | 7/1992 | Ritchey . | |
| 5,247,651 | 9/1993 | Clarisse . | |
| 5,277,584 | 1/1994 | DeFroat et al. ........................ | 434/65 X |
| 5,282,772 | 2/1994 | Ninomiya et al. . | |
| 5,316,480 | 5/1994 | Ellsworth . | |
| 5,354,202 | 10/1994 | Moncrief et al. . | |
| 5,366,376 | 11/1994 | Copperman et al. . | |
| 5,403,238 | 4/1995 | Baxter et al. . | |
| 5,456,604 | 10/1995 | Olmsred et al. ....................... | 434/29 X |
| 5,490,784 | 2/1996 | Carmein ................................ | 434/29 X |
| 5,596,319 | 1/1997 | Spry ...................................... | 434/63 X |

FOREIGN PATENT DOCUMENTS

| | | | |
|---|---|---|---|
| 0 290 364 | 11/1988 | European Pat. Off. ................. | 434/66 |
| 2 128 842 | 5/1984 | United Kingdom ..................... | 434/69 |

*Primary Examiner*—Joe H. Cheng
*Attorney, Agent, or Firm*—Oppenheimer Wolff & Donnelly LLP

[57] ABSTRACT

A reactive ride simulator includes package of sensors along with a telemetry radio transmitter and/or a recorder. This package is carried at a movable remote site, such as aboard an actual vehicle. A radio receiver, or a player for the recorded data from the remote site, is interfaced with a decoder providing a electronic signals which include a replication of the sights, sounds, and motions experienced at the remote site. A motion base is used to provide the accelerations necessary to replicate the G-forces experienced at the remote site, while a cabin on this motion base is associated with audio/visual presentation devices so that a passenger on the reactive ride simulator also receives the audio/visual sensations of being present at the remote site. As a result, the passenger on the reactive ride simulator receives a sensory experience of being at the remote site, or of riding on the actual vehicle, while actually moving only slightly on the motion base.

14 Claims, 2 Drawing Sheets

REACTIVE RIDE SIMULATOR APPARATUS AND METHOD

BACKGROUND OF THE INVENTION

FIELD OF THE INVENTION

The present invention is in the field of amusement rides and vehicle ride simulators. More particularly, the present invention relates to a ride simulator which gives a passenger the false impression of actually experiencing the sights, sounds, and motions occurring (or which have occurred) at a remote site through the use of a combination of stimuli. The remote site can be defined by a vehicle, conveyance, animal (a race horse, for example), human (a surfer or skier, for example), building (such as during an earthquake), or any other environment providing sights, sounds and movements which it is desired to experience in a simulated form at a distance from the remote site. The combined stimuli are presented to the passenger through all of the senses of sight, sound, and touch. While actually moving in only a limited or confined space, the passenger experiences a simulated "ride" on a variety of vehicles, or "presence" at the remote site through the use of this invention. For example, a passenger may "ride" an Indianapolis 500 race car, a drag race car, a power boat, a land speed record car, an aircraft, a jet fighter, and any number of other interesting and potentially dangerous vehicles in which most people will never have an opportunity to ride. Also, a passenger on the reactive ride simulator may experience a ride or "presence" on a Kentucky Derby race horse, a surf board, on water or snow skis, on an Olympic bob sled, or within a building during an earthquake, for example.

Importantly, the invention may provide these simulated vehicle "riding" sensations, or remote site "presence" sensations, to a passenger using a multi-media, or combined sensory menu which is either historical, near-real-time, or actually in real-time while the actual vehicle being simulated is in motion. For example, the passenger may experience a "ride" in a race car while sensory data (i.e., the sights, sounds, and G-forces from the motion of the car) are obtained from an actual racing car on a race track. In this way, the passenger may ride along with a favorite driver in the Indianapolis 500 mile race, for example, and experience the actual sensations of the racing car in competition as well as the spontaneous give-and-take of heated, unpredictable competitive racing as the race is actually in progress.

RELATED TECHNOLOGY

Flight simulators and automobile driving simulators have been in existence for many years. In their rudimentary form, these simulators provide a movie or video tape of the view through an aircraft or automobile windshield so that the "pilot" or "driver" in the simulator can respond to the events viewed as they are presented to the viewer. For example, automobile driving simulators of this type have long been used for driver training. In the use of these driver training simulators, the trainee sits at a console or table equipped with a steering wheel, gas pedal, and brake pedal, which together simulate the controls of an automobile. The trainee views the movie on a screen or sees a video presentation on a television monitor. As the movie or video presentation takes place, the trainee is presented with a variety of driving situations, to which the trainee is to respond with appropriate inputs to the simulated automobile controls. These simulated controls are connected to an instructor's monitoring instrument so that students may be scored on their performance, and those who do not make the appropriate control inputs may be identified and further instructed. Understandably, this rudimentary driver training simulator does not have a high degree of realism. There is no unpredictability in this simulator. Once a student has experienced one training session, that same training movie or video will be familiar, and the student's driving responses will be conditioned by experience rather than being the spontaneous result of a proper response to an unexpected situation. For this reason, a variety of movies or videos need to be provided for use with this type of simulator.

The rudimentary flight simulators operate similarly to driver training simulators. Some conventional simulators of this type combine a sound track with the visual presentation to the trainee. For added realism, this sound track may be recorded in an actual vehicle in operation. More advanced flight and driving simulators add computer graphics generated in real-time, or near-real-time, combined with sound effects also generated to correlate with the visual presentation to enhance the spontaneity and realism of the simulation. These rudimentary systems are limited by the computational power required to generate video images and appropriate sounds in real-time. Some of these simulators allow an instructor to pre-set a situation for presentation to a trainee, or to introduce impromptu changes in the situation as presented even while the training experience is underway. However, these options also require substantial added computational power from the simulator system.

Still more advanced flight simulators add a motion platform on which the trainee or passenger is carried and moved in an enclosed cabin in order to experience the sights, sounds and simulated acceleration forces (herein, "G-forces") correlated with the apparent motions of the simulated aircraft on the ground or in flight. Such motion platforms move only a few inches or feet, and have a limited range of G-forces which may be provided to the passenger in the simulator. These G-forces are provided by a combination of horizontal and vertical accelerations, (resulting in limited horizontal and vertical motions of the cabin), combined with rotational accelerations of the cabin (resulting in angulation or tipping of the cabin through limited angles), so that a portion of the gravitational force can be added to the G-forces generated by some cabin motions. Between sensory movements of the passenger cabin by such a motion base (which sensory movements are intended to impart sensory inputs to the passenger), the cabin of such motion base simulators is smoothly moved at a sub-perceptual rate toward a centered position in anticipation of the next sensory movement. That is, the cabin of the simulator actually has only a limited range of motion so that between sensory accelerations the motion base has to creep back toward its centered position. In this way, as much as possible of the movement of the motion base is available for the next sensory movements of the base.

Vehicle ride simulators have recently been developed based on the flight simulator technology described above. For example, the STAR TOURS attraction at Disneyland in Anaheim, Calif., provides passengers with the simulated experience of riding in an interplanetary space ship during a trip to distant planets. Along the way, passengers participate in an attack on a hostile space ship. The cabin of this ride, of course, moves only a short distance on a motion base while the passengers are provided with a visual and audio presentation simulating the space ship ride. While this visual and audio presentation is under way correlated G-forces are provided to the passengers by motions of the motion base carrying the passenger cabin. To this time, there has not been such an interplanetary passenger spaceship which could have been used to provide the visual, audio, or G-force experience provided to the passengers of this ride. That is, the motions of this passenger cabin, and the resulting sensory G-forces experienced by the passengers, are believed to be those selected by a technician to go along with the visual and audio presentation. These G-forces are not reactions of a motion base to the actual G-forces experienced at a vehicle or other conveyance. This presentation is similar to a cartoon effected with modern visual special effects. Moreover, the degree of realism imparted by such a simulator depends in large measure on the skill of the technicians in selecting the G-forces to be experienced by the passengers, and in correctly timing these G-forces to the visual and audio presentation. In other words, the technicians have to plan and time the motions of the motion base which provides these G-forces to the passengers of the ride so that the impression of movement from riding on the simulated vehicle is correlated with the visual and audio presentation.

Another conventional vehicle ride simulator is similar to the STAR TOURS ride in that it relies on a passenger cabin carried on a motion base, and within which passengers sit to receive a visual and audio presentation. However, this ride simulator uses a visual presentation similar to the early flight simulators or driver training simulators, in that it is recorded by a camera looking forward through the windshield of an actual vehicle of the type being simulated. An audio presentation also recorded in the actual vehicle is used along with this visual presentation to the passengers in the simulator. Thus, this simulator has true correlation of the visual and audio presentation, and a good level of realism in this respect. Moreover, the visual and audio presentation used in this simulator is similar to that sometimes provided to television viewers who can receive a audio/visual signal fed from an on-the-car camera and microphone of a racing car. The home television viewer, of course, has no sense of the G-forces experienced in the racing car. On the other hand, the passengers in the simulator see the view through the windshield and hear the sounds of an actual vehicle, such as a NASCAR stock car on the track at Daytona Beach, Fla., for example, while also experiencing simulated G-forces. However, with this ride simulator as with the STAR TOURS ride, the G-forces experienced by passengers in the simulator, and their timing in correlation with the visual and audio presentation, are simulated and depend on the skill of a technician. This ride is not reactive, because it does not drive a motion base using G-force data actually collected at the vehicle or other remote site being simulated. Thus, the realism achieved by this conventional ride simulator is also highly dependent upon the skills of a technician.

Conventional technology which may be considered to be relevant to the present invention is found in one or more of the following United States patents: U.S. Pat. No. 4,771,344, issued 13 Sep., 1988, appears to relate to a system for enhancing an audio/visual presentation, such as for viewers of a boxing match, by adding a sensory perception simulating the striking of blows as these blows occur in the actual boxing match. In this way, the usual vicarious participation in the boxing match by spectators can be enhanced. The system may include a device simulating the receiving of such blows also. The participant in this simulation of participation in the boxing match wear "boxing gloves", which include a remotely controlled "knuckle rapper". This knuckle rapper strikes the wearer on the knuckles to simulate the landing of a blow with the participant's fist. By the actions of a technician, the knuckle rapping is synchronized with the actual blows landed in the boxing match, so that the impression of being in the boxing match is enhanced for the participants in the simulation. This system relies for its realism on the skills of the technician to synchronize the knuckle rapping with the actual blows given in the boxing match.

U.S. Pat. No. 5,130,794, appears to disclose a panoramic camera and panoramic imaging system. Real-time imagery from a vehicle in motion can apparently be provided to a spectator, but the spectator does not receive simulated accelerations (G-forces) from the vehicle in motion.

U.S. Pat. No. 5,282,772, appears to relate to a ride simulator for giving passengers a simulated ride down a river rapids. The ride simulator includes a theater upon which a visual presentation is projected, along with water splash, river sounds, and wind. The "boat" in which passengers ride is swayed and tilted by a mechanism (which is similar to a motion base mechanism) under the a water channel carrying the boat so that riders have the false experience of shooting down a river rapids. Acceleration forces from an actual boat on an actual river rapids is apparently not used in this simulation. This simulation would again appear to rely for its realism upon the skills of a technician to provide and time G-forces to the audio/visual presentation.

U.S. Pat. No. 5,316,480, is believed to disclose a multimedia (sight, sound, and motion) ride simulator with a passenger cabin moved by actuators while a audio/visual presentation is made to the passengers. The ride includes a real-time video presentation of familiar surroundings during an initial and concluding parts of the ride so that passengers have the impression of leaving the local of the ride on a moving vehicle, and later of returning to this same spot. This ride simulator does not appear to use G-forces from an actual vehicle to drive the motion base of the ride.

U.S. Pat. Nos. 5,354,202; and 5,366,376, issued 11 Oct., and 22 Nov., 1994, both appear to relate to driving simulators. The first of these patents appears to relate to an arcade game, with a stationary seat for the player. There is not motion base involved in this game, and no simulation of G-forces for the simulated vehicle. The latter of these two patents appears to disclose another stationary driving simulator, again with no simulation of the G-forces for the simulated vehicle. Conventional arcade games or simulators are also known which are believed to be similar to that of the '202 Patent discussed immediately above, but which also include a "seat shaker" or some other moving mechanism for the seat in which the occupant sits. However, all of these devices would appear to be very much lacking in realism compared to the experience provided by the present invention.

Finally, U.S. Pat. No. 5,403,238, issued 4 Apr., 1995, appears to relate to an amusement ride in which passengers actually do ride on a vehicle, which vehicle includes mechanisms to enhance the impressions received by the passengers that the vehicle is out of control or is following a perilous course. There appears to be the use of audio/visual effects in conjunction with this vehicle. However, there is not use of G-forces from an actual vehicle in motion to control a motion base.

SUMMARY OF THE INVENTION

In view of the deficiencies of the conventional technology, a primary object for this invention is to overcome one or more of these deficiencies.

An additional object for this invention is to provide a reactive ride simulator in which the G-forces experienced by a passenger in the ride on a motion base are derived from the actual G-forces of the "remote site" (i.e., vehicle, conveyance, animal, earthquake, or other situation of dynamic motion experience) being simulated.

An object for this invention is to provide a reactive ride simulator in which the G-forces experienced by a passenger in the ride on a motion base are not interpretations of actual G-forces (which interpretations are provided by a technician, for example), but are based on the actual G-forces of the "remote site" being simulated.

Accordingly, a corollary objective for the present invention is to provide such a ride simulator in which the services of such a technician or other person to provide interpreted G-forces for the motion base are not needed.

Additionally, it is an object for this invention to provide a reactive ride simulator of the type described above, in which the passenger while experiencing G-forces on a motion base which are derived from the actual G-forces of the remote site being simulated, is also presented with the sights and sounds of the remote sight while the dynamic motion experience which creates these G-forces is underway.

Still another object for this invention is to provide a reactive ride simulator in which the simulation may occur either in real-time or near-real-time while the actual remote site is in motion, or may be recorded for later enjoyment long after the actual event has passed into history.

Accordingly, the present invention in accord with one aspect thereof provides a reactive ride simulator for providing to a passenger in the ride simulator a sensory experience of riding on a movable remote site in motion while in fact the passenger moves only a short distance aboard the ride simulator, the reactive ride simulator comprising; means for collecting from the remote site in motion at least a portion of the G-forces actually experienced there; a motion base carrying the passenger and reacting to the means for collecting by responsively moving the passenger to replicate the G-forces; whereby, the ride simulator reacts to those G-forces actually experienced at the remote site in motion to replicate these G-forces for the passenger.

According to another aspect, the present invention provides a reactive ride simulation method of providing to a human passenger a sensory experience of being at a remote site in motion, such as a simulation of riding on a vehicle or conveyance which is or was in the past actually in operation or motion, while the passenger in fact moves only a short distance aboard a reactive ride simulator within a confined area, the method comprising steps of: collecting from the remote site in motion at least a portion of the G-forces actually experienced there; and providing a motion base carrying the passenger, and causing the motion base to react to the G-forces collected from the remote site by responsively moving the passenger to replicate the G-forces.

An advantage of the present invention results from its not depending on the skills of a motion base technician to program the motion base to prove simulated or replicated G-forces. That is, the present invention uses actual G-forces sensed and/or recorded on the actual remote site (i.e., on a vehicle, for example) while in motion. These actual G-forces are used to provide the command inputs to the motion base. In this way, the optimum of realism and spontaneity may be provided to a passenger on the ride. The sights, sounds, and G-forces (within the limits of the motion base) of the actual remote site being simulated are provided to the passengers on the ride. When the reactive ride simulator is operated in real-time or near-real-time, the ride has the same spontaneity and lack of predictability as does real life. However, should the remote site be a vehicle which crashes, for example, the passengers on the ride are not exposed to the violent G-forces of the crash because the motion base is not capable of generating that kind of force. On the other hand, the present invention when operating with recorded visual, audio, and G-force data for a vehicle event in the past, such as for the winning car of the Indianapolis 500 mile race, allows passengers on the simulator to "ride" along in the winning race car.

BRIEF DESCRIPTION OF THE DRAWING FIGURES

DETAILED DESCRIPTION OF AN EXEMPLARY PREFERRED EMBODIMENT OF THE INVENTION

Figure 1:
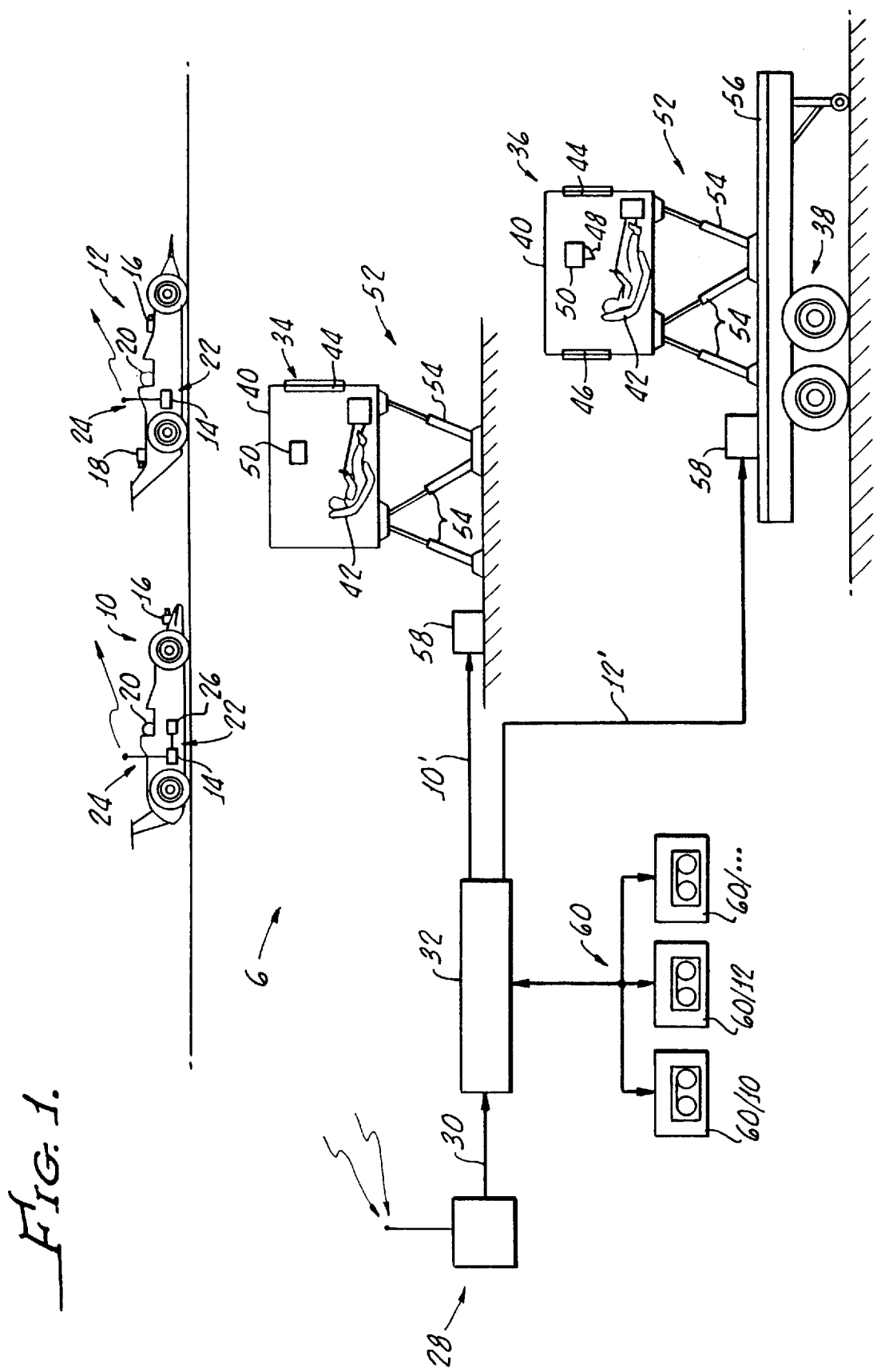
FIG. 1 is a schematic pictorial presentation of a reactive ride simulator embodying the invention; and in this case simulates a ride in one of several racing cars on a race track.

Viewing FIG. 1, a reactive ride simulator embodying the present invention is generally referenced with the numeral 6. A remote site to be simulated for passengers on the ride 6 is provided in this instance by a pair of racing cars, indicated individually with the reference numerals 10 and 12. These racing cars are in motion and in operation to participate in an automobile race. The race cars 10 and 12 are depicted as open-wheeled grand prix type of vehicles, designed for and capable of carrying only a driver. In this case, riding along as a passenger is such a vehicle is a physical impossibility. However, the depiction of cars 10 and 12 is exemplary only, and other types of cars and other vehicles may be interfaced with the present invention, as the remote site being simulated for a passenger or passengers on the simulator.

The present invention may be used with any number of other types of vehicles. For example, an aircraft may be used with the present invention as the vehicle in which a "ride" for a passenger in the aircraft is simulated. Thus, the racing cars 10 and 12 will be understood to be exemplary only, and to not represent a limitation concerning the type or types of vehicles which may be used in conjunction with the present invention. Further, it is to be understood that virtually any other type of remote site which is capable of carrying the necessary telemetry package may be used with the present invention. Thus, a surfer could carry a telemetry package according to the present invention, and passengers could experience the surfing experience by use of this invention.

Also, it will be understood that the number of vehicles interfaced with the present invention is not limited to one or two. In fact, all of the cars in a particular automobile race, for example, could be interfaced with the present invention. In that case, as will be seen, it could be assured that the experience of riding along with the one winning driver of the race could be simulated for enjoyment by any number of "passengers" using the present invention. Of course, with the present invention, being a "passenger" in one of the race cars does not involve actually being in the car, and the "passenger" is not exposed to any of the risks of injury or death that riding along in an actual race car during an actual automobile race would involve for a real passenger. For this reason, hereinafter, when a "passenger" is referred to, the reader will understand that the individual referred to is actually in a reactive ride simulator embodying the present invention.

Each racing car 10 and 12 carries its own telemetry package, generally indicated with the numeral 14. Each telemetry package 14 includes at least a forward-facing video camera, indicated with the numeral 16, which provides a video signal of the forward sights seen by the driver of the car 10 or 12 as the race progresses. A rearward facing camera 18 may also be carried, as is the case with car 12, so that a "passenger" riding the car 12 through use of the present invention may have the sensation of realism increased by being provided not only with the forward view from the car, but also with the "rear view mirror" view. As will be seen, the present invention may be used with an array of cameras like the camera 16 and 18, but arranged to provide a full or nearly full 360° panoramic view of the sights at the remote site being simulated.

Also, each telemetry package includes a microphone array, indicated with the arrowed numeral 20, preferably positioned close to the driver's head so that this microphone array provides at least one audio signal of the sounds experienced by the driver of the car as the race progresses. Preferably, this microphone array includes a number of individual microphones positioned around the driver, or on the various sides of the car 10 or 12, so that a "passenger" may be provided with stereo sound replicating not only the gross sound experienced by a racing driver, but also its direction as other cars are passed and pass by, for example. Preferably, one of the microphones of the array 20 may be the same microphone used by the driver to communicate with his crew via another two-way radio link (not shown). By interfacing with this radio link between the driver and his crew, the two-way communications between driver and crew may also be included in the simulation experienced by "passengers" in the race cars 10 or 12, if desired. Again, for the "passenger", the element of realism and of seeming to actually participate in the drama and strategy of the automobile race is increased by including this two-way communication between the driver and crew, along with the actual sounds heard by the driver in the race car.

Each telemetry package includes a six degree-of-freedom (or, so called, 6-axis) accelerometer, indicated generally with the arrowed numeral 22. This accelerometer 22 includes three linear accelerometers arranged along mutually orthogonal axes in order to respond respectively to forward, lateral, and vertical linear accelerations/decelerations experienced at the respective race cars 10 and 12. The other three axes of the accelerometers 22 are provided by three angular-rate accelerometer sensors respectively arranged to respond to pitch, roll, and yaw of the respective race car 10 and 12. The telemetry packages 14 each include a radio data transmitter, indicated with the schematic radio antenna, and the arrowed numeral 24. This radio data transmitter 24 broadcasts an individual radio signal from each race car 10 and 12, which signal carries the video feed from at least camera 16 (and from camera 18, if the car is so equipped), from the microphone array 20, and from the accelerometer 22. Car 10 also includes a multi-channel recorder, indicated with the numeral 26, which records the data experienced in the car 10. That is, the recorder 26 records the video, audio, and acceleration data experienced in the car 10 during the actual automobile race, and for at least a portion of this race.

Further viewing FIG. 1, it is seen that the reactive ride simulator 6 further includes a radio data receiver, indicated with the numeral 28. Although only a single antenna is indicated in conjunction with the radio data receiver 28, those skilled in the pertinent arts will recognize that individual antenna, or plural antennae, for each race car 10 and 12 may be employed. The radio data receiver 28 provides an output signal, indicated with the arrow 30, containing the data provided from the cars 10 and 12, to a decoder, generally indicated with the numeral 32. In overview, it will be seen that the decoder 32 provides output signals, indicated with the arrows 10' and 12' because they originate with cars 10 and 12, to ride simulator bases 34 and 36.

It will be understood that the reactive ride simulator 6 is not limited to one or two ride simulators, but may include a plurality of these simulators. Alternatively, each ride simulator may receive data from one of the cars in a race, or more than one "passenger" may choose to receive data from a particular race car. Thus, several "passengers" who share the same favorite race driver may "ride along" with that particular driver during the race. The ride simulator base 36 is carried on a mobile chassis 38, such as on a road-capable trailer. For example, this trailer may be towed from site to site by a tractor truck, not shown. Accordingly, the simulator base 36 is easily portable, for movement from one race track to another, for example. In order to carry a passenger, each simulator base 34 and 36 includes an enclosed cabin 40 within which is provided a seat 42 for receiving a "passenger" (who is illustrated, but not referenced). It will be understood that the cabin 40 need not be enclosed, and can instead take the form of an open passenger seating or standing platform. That is, the cabin 40 may be open so that the passenger receives the audio/visual presentation in a theater-like environment. Also, the cabin 40 may allow the passenger to stand, for example, to simulate skiing, while being constrained against being thrown from the cabin 40. In the present instance, preferably the seat 42 replicates the racing seats used in the cars 10 and 12 in order to improve the impression of realism for the "passenger". Although not shown in the schematic FIG. 1, it will be understood that the interior of cabin 40 may be provided with, for example, a mock up of that portion of the body work of a racing car (like the cars 10 or 12) which immediately surrounds the cockpit and seat of such a car. In this way the impression of realism for the "passenger" can be enhanced.

At the forward end of each cabin 40 is a large-screen video display device 44, such as a projection television. The simulator base 36 also has another large screen video display device 46, such as another projection television, within the cabin 40 and located behind the passenger for providing the rear view mirror scene to this passenger, recalling the camera 18 on car 12. Accordingly, the cabin 40 of simulator base 36 is provided with a rear view mirror 48, preferably mounted to the mock-up body work just like that on the actual race cars 10 and 12. As explained above, this "passenger" in the simulator base 36 will have an even more realistic experience because the "rear view mirror" scenes are also provided. As will be understood, the cabins 40 may include more than two display devices like the devices 44 and 46. In this case, the passenger may be provided with side views as well, and may be provided with a full 360° panoramic view of the action around the remote site (i.e., around the particular one of the racing cars 10 or 12). Those ordinarily skilled in the pertinent arts will also recognize that in the case of a theater type of presentation, the passengers may be provided with a panoramic large-screen presentation of the sights around the remote site.

Within the cabin 40 is disposed an array of speakers 50, which in their acoustical effect within the enclosed cabin replicate the directional response of the array of microphones 20 at the cars 10 and 12. Thus, sounds provided to the "passenger" by this array of speakers replicates the sounds and directions for these sounds which the driver of the actual race car experiences while actually participating in the automobile race. It follows, for example, that when another race car is passed by one of the cars 10 or 12, the "passenger" of that race car will actually hear the sounds of the car being passed on the proper side of the simulator base 34 or 36, as well as the doppler effect on these sounds as the car is overtaken and then falls behind. These sound effects add greatly to the impression of realism.

Finally, each cabin 40 is carried on a motion base, generally indicated with the numeral 52. Each motion base includes plural extensible actuators 54, which commonly include elongate hydraulic cylinders, pivotally connected at their lower ends to the base structure 56 of the simulator base 34 or 36, and also pivotally connected at their upper ends to the underside of the respective cabins 40. Those ordinarily skilled in the pertinent arts will recognize that the actuators 54 may take another form. For example, some motion bases use ball-screw actuators driven by respective electric motors, and other motion bases use a scissors-jack type of mechanism which is moved by hydraulic cylinders or other actuators, but which does not directly support the passenger cabin on the actuators. All of these conventional alternatives for actuation of the motion base mechanism are within the ordinary skill of those knowledgeable in the pertinent arts, and are intended to be encompassed within the scope of the present invention. Thus, it is seen that the pivotal and translational positions of the cabins 40 can be controlled in six degrees of freedom (i.e., in linear acceleration and position front-to-back, laterally, and vertically; as well as in rotation by tipping accelerations and angular positions in pitch, roll, and yaw) by coordinated extensions and retractions of the plural actuators 54.

Each motion base 52 is controlled and powered by an interface unit, indicated with the numeral 58. This interface unit 58 includes the conventional hydraulic pumps and valving (not shown) for control of the actuators 54, as well as electronics to interpret control signals received from the decoder 32 so that each particular motion base 52 provides accelerations replicating the accelerations experienced in the race cars 10 and 12. The interface units 58 pass the video portion of the program for the passenger in the particular cabin 40 on to the video display devices 44 (and 46 in the case of ride simulator 36), while passing the audio portion of the program on to the speakers 50. The decoder 32 is also interfaced with a plurality of multi-channel recorder/players, generally indicated with the numeral 60. Each individual recorder/player of the plurality 60 is indicated with the numeral 60 followed by the numeral of the car for which it records and can play back data (i.e., 60/10, 60/12, 60/etc). Thus, it will be understood again that the reactive ride simulator 6 may be interfaced with more than only one or two cars in the particular race. Each car for which the reactive ride simulator 6 has an interface will have an associated one of the recorder/players (i.e., 60/etc) so that the data from that race car may thereafter be repeatedly experienced by a succession of "passengers" in the ride simulators 34 and 36 (although not in real-time).

Figure 2:
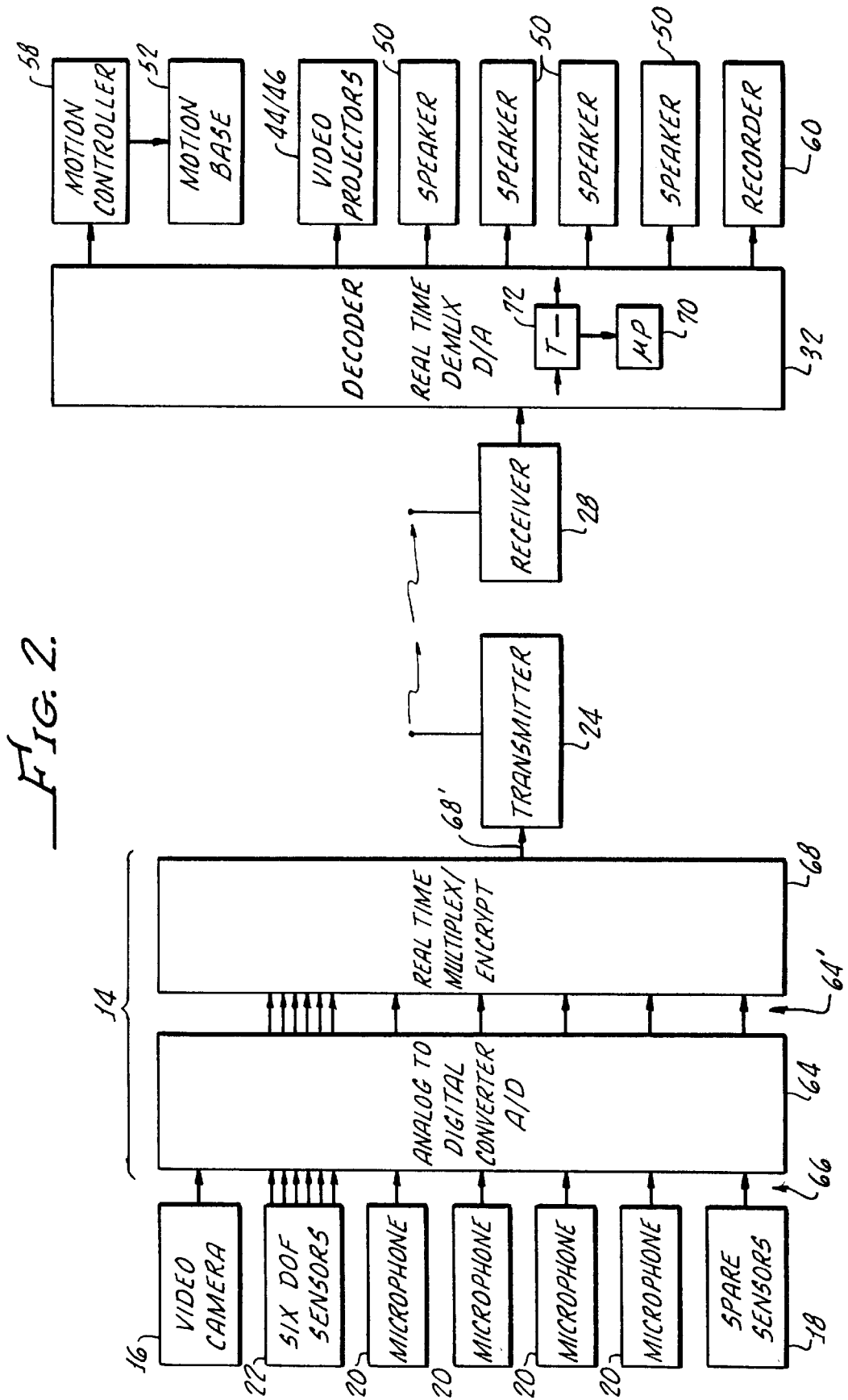
FIG. 2 is a schematic block diagram of a portion of the reactive ride simulator depicted in FIG. 1.

Viewing now FIG. 2, it is seen that the telemetry package 14 of each race car 10 and 12 includes an analog-to-digital (A/D) converter 64 receiving the data inputs from the various sources previously identified. The A/D converter 64 has more channels for input data than are used by the video camera 16, microphone array 20, and six-axis accelerometer 22. Thus, the additional available input channels to A/D converter 64 (indicated collectively with the arrowed numeral 66) are used for such inputs as the video camera 18, and possibly for spare sensors, such as for a spare accelerometer or for a wind force sensor, etc. This A/D converter 64 provides its digitized output signal, indicated with the arrowed numeral 64', to a multiplexer 68 which provides the multiplexed digital data (indicated with arrowed numeral 68') to radio data transmitter 24. This data is received by radio data receiver 28, and is supplied to decoder 32. The decoder 32 performs de-multiplexing of the data, and converts digital values back to analog values {i.e., a digital-to-analog (D/A) conversion} for driving the display devices 44 and 46, speakers 50, and recorders 60.

Additionally, this decoder 32 includes sufficient computer power {indicated with microprocessor 70 ($\mu$P)} to derive the necessary control signals for the motion bases 52, while still providing the sub-sensory sneak-back function which restores the motion bases to their centered positions. Those ordinarily skilled in the pertinent arts will recognize that conventional wash out equations can be used to interpret the actual G-forces from the race cars 10 and 12, and to provide the control signals for the motion bases 52 which best replicate the G-forces actually experienced within the limitations of the motion bases. Additionally, the Applicant has determined that the decoder 32 may also include an optional and comparatively short interval time delay function 72 (T→) (i.e., effectively a time shifting function) which delays the video signal and audio signals, while allowing the microprocessor 70 the additional interval of this delay in which to prepare the motion bases 52 for sensory movements. Thus, the reactive ride simulator 6 may operate in a real-time mode, with the video, audio, and motion base movements closely correlating to the action on the race track for cars 10 and 12, or may operate in an optional near-real-time mode in which the action for the "passenger" is slightly delayed with respect to the real action, but in which the motion base 52 may provide improved dynamic response and realism because of the anticipatory function allowed for microprocessor 70 by the delay interval provided by delay function 72.

In order to complete this description of the reactive ride simulator 6, it must be noted viewing FIG. 2 that the decoder 32 has a two-way interface with the recorder 60. Thus, the data from a particular race car can be used repeatedly after an actual race to allow a "passenger" to repeat any portion of the race. Additional "passengers" may experience a race in a particular car with a particular driver long after the event actually took place. Further, for use as a driver training facility, less experienced race drivers can use the reactive ride simulator to "ride along" with more experienced drivers, and to, thus, improve their own driving and racing skills. Additionally, other personnel, such as race mechanics and engineers can use the reactive ride simulator to analyze performance and operational problems with a particular car. Still further, the present reactive ride simulator may prove to be a very valuable learning tool for drivers who have an accident. These drivers can re-experience the events leading up to the accident, and can thus learn from the experience where opportunities to avoid the accident were missed in reality. Also, the recording made by the recorder 26 aboard the car 10 may be played on one of the recorder/players 60 so that a "passenger" in the ride simulator may experience at least a portion of what the driver of the car experienced during the race. In the case of reactive ride simulators used with other types of remote sites, the performance data collected by the present invention can be equally valuable.

Further to the above, it will be understood that this invention is not limited to use with race cars. As pointed out above, a wide variety of remote sites (i.e., conveyances, people, animals, and vehicles of all sorts, both powered and un-powered) may be equipped with the interface sensors and telemetry packages 14 for use with the present reactive ride simulator. For example, Olympic bob sleds could be so equipped so that spectators could ride along with their national team during or after the Olympics. Any number of other and additional uses for the present invention will suggest themselves to people as time passes. Another use, for example, of the present invention is to allow "passengers" to travel along on such vehicles as the space shuttle, or a Reno air races unlimited racing propeller aircraft, so that a wider segment of the population can experience (albeit in a simulated form) the thrill of these activities. Additionally, for people who are unskilled as certain physical activities, or who are physically challenged or disadvantaged, the present invention could be used to replicate a number of experiences which these people cannot themselves experience. For example, a person (such as a skier, or surf boarder) could carry a telemetry package according to the present invention during a ski run or surf boarding experience. A motion base equipped with a cabin having a wind-generating fan or water spray device could then very well replicate the experience of skiing or surf boarding). All of these uses and others are intended to be within the scope of the appended claims.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. A reactive ride simulator for providing to a passive passenger in the ride simulator a sensory experience of riding on a movable remote site in motion and under the active control of another person while in fact the passive passenger moves only a short distance aboard the ride simulator, said reactive ride simulator comprising;

means for collecting from the remote site in motion and at a place away from said remote site at least a portion of the G-forces actually experienced there while said remote site is under the active control of said another person;

a motion base carrying the passive passenger and reacting to said means for collecting by responsively moving the passive passenger to replicate said G-forces;

whereby, said ride simulator reacts to those G-forces actually experienced at the remote site in motion to replicate these G-forces for the passive passenger.

2. The reactive ride simulator of claim 1 wherein said means for collecting includes a multi-axis accelerometer carried at the remote site.

3. The reactive ride simulator of claim 2 wherein said multi-axis accelerometer includes three linear accelerometers arranged along mutually orthogonal axes in order to respond respectively to forward, lateral, and vertical linear accelerations/decelerations experienced by the remote site, and three angular rate acceleration sensors respectively arranged to respond to pitch, roll, and yaw of the remote site.

4. The reactive ride simulator of claim 1 wherein said means for collecting includes a multi-channel recorder recording those G-forces experienced aboard the remote site while actually in motion.

5. The reactive ride simulator of claim 1 wherein said means for collecting includes a telemetry package, said telemetry package carried aboard the remote site in motion, said telemetry package including an analog-to-digital converter receiving signals indicative of those G-forces experienced aboard the remote site and responsively providing digitized versions of said G-force signals, a multiplexer receiving said digitized versions of said G-force signals and responsively providing a multiplexed serial version of said G-force signals, and a radio data transmitter receiving said multiplexed serial version of said G-force signals and broadcasting a radio wave version of these G-force signals.

6. The reactive ride simulator of claim 5 wherein said means for collecting includes a radio data receiver receiving said radio wave version of said G-force signals and responsively providing an electrical version of said multiplexed serial version of said G-force signals, a de-multiplexer receiving said electrical version of said multiplexed serial version of said G-force signals and responsively providing plural digital versions of said G-force signals, and an digital-to-analog converter receiving a digital G-force signal from said de-multiplexer and responsively providing an analog G-force signal to said motion base for causing said motion base to reacting by responsively moving the passive passenger to replicate said G-force.

7. The reactive ride simulator of claim 1 wherein said ride simulator further includes means for collecting from the remote site in motion at least a portion of those sights and sounds actually experienced at the remote site while in motion and under the active control of said another person; a cabin for receiving a passive human passenger aboard said ride simulator, and said cabin being provided with associated audio/visual means interfacing with said means for collecting for replicating those sights and sounds actually experienced at the remote site under the active control of said another person, so that the passive passenger aboard said ride simulator is exposed to a sensory experience of being aboard the remote site in motion and under control of said another person.

8. The reactive ride simulator of claim 1 wherein said remote site includes a vehicle under the active control of said another person.

9. A real-time reactive ride simulator for providing to a passive passenger in the reactive ride simulator a sensory experience of being at a movable remote site contemporaneously in motion and under the active control of another person, while in fact the passive passenger moves only a short distance aboard the reactive ride simulator, said reactive ride simulator comprising;

first means for collecting from the remote site, while the remote site is actually in motion and under the active control of said another person, at least a portion of those sights and sounds actually available to be experienced at the remote site;

second means for contemporaneously collecting from the remote site, also while the latter is actually in motion and under the active control of said another person, at least a portion of the G-forces actually experienced at the remote site;

a cabin for receiving the passive passenger and being provided with associated audio/visual means interfacing with said first means for collecting for replicating those sights and sounds actually available at the remote site in motion, so that the passive passenger aboard said reactive ride simulator is exposed to a visual and auditory sensory experience of being aboard the vehicle while it is in motion and under the active control of said another person;

a motion base carrying said cabin and having means for interfacing with said second means for collecting said G-forces, and for responsively manipulating said cabin to replicate said G-forces, so that the passive passenger is exposed to a sensory experience of the motion of the remote site;

whereby, said reactive simulator reacts to those G-forces actually experienced by the remote site in motion substantially in real-time while under the active control of the said another person to replicate these G-forces for the passive passenger in conjunction with the contemporaneous replication of the sights and sounds available to be experienced at the remote site.

10. The reactive ride simulator of claim 9 further including a telemetry means for transmitting both said sights and sounds from said first collection means, as well as said G-forces from said second collection means, away from the remote site to a receiver not moving with the remote site.

11. The reactive ride simulator of claim 10 wherein said telemetry means includes a radio data transmitter aboard the remote site, and a radio data receiver.

12. A reactive ride simulator for providing to a passive passenger in the ride simulator a sensory experience of actually being at a remote site in motion and under the active control consisting of another person, an automation, and a natural event, as aboard a vehicle, animal, or other conveyance in operation or; while in fact the passive passenger moves only a short distance aboard the reactive ride simulator, said reactive ride simulator comprising;

first means for collecting from the remote site and at a location away from the remote site at least a portion of those sights and sounds actually available to be experienced at the remote site while the latter is actually in motion and under the active control of a controller selected from the group consisting of another person, an automation, and the laws of nature, second means for collecting from the remote site and at a location away from the remote site, also while the latter is actually in motion while under the active control of said controller, at least a portion of the G-forces actually experienced at the remote site;

a cabin for receiving a passive human passenger, said cabin being associated with audio/visual means interfacing with said first means for collecting for replicating those sights and sounds actually available for experience at the remote site in motion, so that the passive passenger aboard said ride simulator is exposed to an audio/visual sensory experience of being at the remote site;

a motion base carrying said cabin and having means for interfacing with said second means for collecting said G-forces, and for responsively manipulating said cabin to replicate said G-forces, so that the passive passenger is exposed to a sensory experience of the motion of the remote site;

whereby, said reactive ride simulator reacts to those G-forces actually experienced at the remote site in motion and while under the active control of said controller to replicate these G-forces for the passive passenger in conjunction with the replication of the sights and sounds available to be experienced at the remote site.

13. A reactive ride simulation method of providing to a passive human passenger a sensory experience of being at a remote site in motion and under the active control consisting of another person, an automation, and a natural event, while the passive passenger in fact moves only a short distance aboard a reactive ride simulator within a confined area, said method comprising steps of:

collecting at a place away from the remote site and from the remote site in motion while under the active control of a controller selected from the group consisting of another person, an automation, and the laws of nature at least a portion of the G-forces actually experienced there; and providing a motion base carrying the passive passenger, and causing said motion base to react to said G-forces collected from said remote site by responsively moving the passive passenger to replicate said G-forces.

14. A reactive ride simulation method of providing to a passive human passenger a real-time sensory experience of being at a movable remote site while the latter is actually in motion and under the active control of another person, while the passive passenger in fact moves only a short distance on a reactive ride simulator within a limited area, said method comprising steps of:

providing first means for substantially real-time collection from the remote site, while the latter is actually in motion and under the active control of said another person, at least a portion of those sights and sounds actually available to be experienced at the remote site;

providing second means for substantially real-time contemporaneous collection from the remote site, also while the latter is actually in motion and also under the active control of said another person, at least a portion of the G-forces actually experienced at the remote site;

providing a cabin for receiving the passive passenger and being associated with audio/visual means interfacing with said first means for collection for replicating those sights and sounds actually available to be experienced at the remote site, and exposing the passive passenger aboard said ride simulator to an audio/visual sensory experience of being at the remote site in motion;

providing a motion base having means for interfacing with said second means for collecting said G-forces, and using said motion base to carry said cabin and to responsively manipulate said cabin to replicate said G-forces, and exposing the passive passenger to a sensory experience of the motion at the remote site;

whereby, the passive passenger experiences a replica of the sights, sounds, and G-forces available to be experienced at the remote site in substantially real-time while the remote site is in motion and under active control of another person.

* * * * *